United States Patent [19]

Johnson et al.

[11] Patent Number: 4,961,770

[45] Date of Patent: Oct. 9, 1990

[54] PROCESS FOR PRODUCING SPHERICAL GLASS PARTICLES

[75] Inventors: Walter A. Johnson, Towanda; Nelson E. Kopatz; Lori S. Pruyne, both of Sayre, all of Pa.

[73] Assignee: GTE Products Corporation, Stamford, Conn.

[21] Appl. No.: 319,791

[22] Filed: Mar. 6, 1989

Related U.S. Application Data

[63] Continuation of Ser. No. 54,116, May 22, 1987, abandoned, which is a continuation of Ser. No. 836,923, Mar. 6, 1986, abandoned.

[51] Int. Cl.$^5$ .............................................. C03B 19/10
[52] U.S. Cl. ..................................................... 65/21.3
[58] Field of Search ........................... 65/21.3, 21.4, 22

[56] References Cited

U.S. PATENT DOCUMENTS

| | | | |
|---|---|---|---|
| 2,794,301 | 6/1957 | Law et al. | 65/21.3 |
| 2,859,560 | 11/1958 | Wald et al. | 65/21.3 |
| 4,475,936 | 10/1984 | Aston et al. | 65/21.3 X |
| 4,487,620 | 12/1984 | Neusy | 64/21.3 |
| 4,643,753 | 2/1987 | Brown | 65/21.3 |

OTHER PUBLICATIONS

Production and Character; Action of Glass and Spheres for Microanalysis, Small et al., Scanning Electron Microscopy, 1978, vol. I, pp. 445–454.

Disintegrator to Make Grains for Glass Microsphere, Bychkov et al., Translated from Steklokeramika, #10, pp. 14–15, 10/1979, 0361-7610, Oct. 1979 © Plenum Pub. Co., 1980, pp. 558–560.

*Primary Examiner*—Robert L. Lindsay
*Attorney, Agent, or Firm*—Donald R. Castle

[57] ABSTRACT

A composition is disclosed consisting essentially of substantially spherical glass particles having a diameter of less than about 25 micrometers.

A process is disclosed for producing substantially spherical particles. The process involves providing irregularly shaped glass particles having a predetermined particle size, entraining the particles in a carrier gas, feeding the entrained particles into a high temperature zone having a temperature sufficiently above the softening point of the glass to allow surface tension to subsequently spheroidize the particles and having a temperature below the vaporization temperature of the glass. The particles are maintained in the high temperature zone for a sufficient time to convert at least a portion of the particles into droplets without the formation of a substantial amount of filaments affter which the droplets are cooled to form solid spheres having essentially the same particle size as the irregularly shaped particles and a reduced surface area as compared with the irregularly shaped particles.

4 Claims, 2 Drawing Sheets

PROCESS FOR PRODUCING SPHERICAL GLASS PARTICLES

This application is a continuation of Ser. No. 054,116, filed May 22, 1987 which is a continuation of Ser. No. 836,923, filed Mar. 6, 1986 both abandoned.

BACKGROUND OF THE INVENTION

This invention relates to a process for producing spherical glass particles and to the spherical glass particles thus produced.

Glass spheres of relatively small particle size have found use in a wide range of applications such as in electronics and injection molding of plastics.

U.S. Pat. No. 4,390,368 discloses a free flowing plasma spray powder of substantially spherical particles having a composition consisting essentially of rhenium and tungsten. However, spherical glass particles are more difficult to form because of the higher viscosity of glass at its melting point. Therefore there is a tendency to form glass filaments as opposed to spheres.

U.S. Pat. No. 3,313,608 describes a method for producing spherical glass beads in which electrical and magnetic fields are used to break up a molten glass stream of about 0.15" in diameter. The beads are of relatively large particle size, with the size range being from about 0.005 to about 0.200 inches in diameter.

One prior art method for forming glass beads of relatively small size is by grinding the glass into small particles followed by injecting the particles into a frame from a burner to melt the particles and allow surface tension to form the particles into spheres. One disadvantage of this method is the formation of a large number of glass filaments along with the spheres. In order to be recycled in the operation, the filaments must be remelted which is a costly operation.

Commercial glass beads have a particle size in the range of 10 micrometers to 53 micrometers with an average diameter of 30 micrometers. Such beads are described in an article entitled "Shear Band Formation in Polycarbonate-Glass Bead Composites," by M. E. J. Decker and D. Heikens, Journal of Materials Science 19 (1984) 3271-3275.

Therefore, glass spheres produced without production of undesirable filaments would be an advancement in the art and additionally a process for producing such spheres would be desirable.

U.S. Pat. Nos. 4,076,640, 4,191,556, 4,376,740, 4,490,601, 3,829,538, 4,252,599, 4,474,604, 4,435,342, 3,742,585, 4,332,617, 4,386,896, 4,264,641, 4,215,084, 4,069,045, 4,259,270, 3,907,546, 4,028,095, and 3,909,241, and Canadian Patent No. 941,690 relate to metal, alloy, or ore powders or particles or melts and are different from the present invention in that the present invention relates to spherical glass parrticles.

SUMMARY OF THE INVENTION

In accordance with one aspect of this invention, there is provided a composition consisting essentially of substantially spherical glass particles having a diameter of less than about 25 micrometers.

In accordance with another aspect of this invention, there is provided a process for producing substantially spherical particles. The process involves providing irregularly shaped glass particles having a predetermined particle size, entraining the particles in a carrier gas, feeding the entrained particles into a high temperature zone having a temperature sufficiently above the softening point of the glass to allow surface tension to subsequently spheroidize the particles and having a temperature below the vaporization temperature of the glass. The particles are maintained in the high temperature zone for a sufficient time to convert at least a portion of the particles into droplets without the formation of a substantial amount of filaments after which the droplets are cooled to form solid spheres having essentially the same particle size as the irregularly shaped particles and a reduced surface area as compared with the irregularly shaped particles.

DETAILED DESCRIPTION OF THE INVENTION

Figure 1:
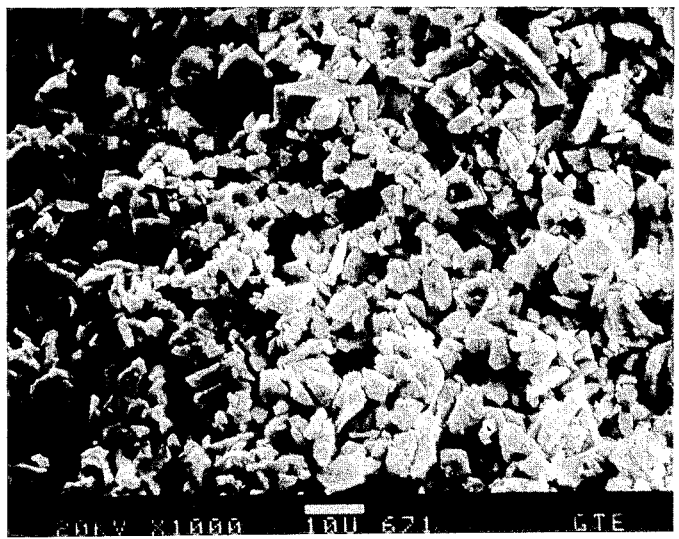
FIG. 1 shows photomicrographs of irregularly shaped glass particles produced by prior art methods.
Figure 1:
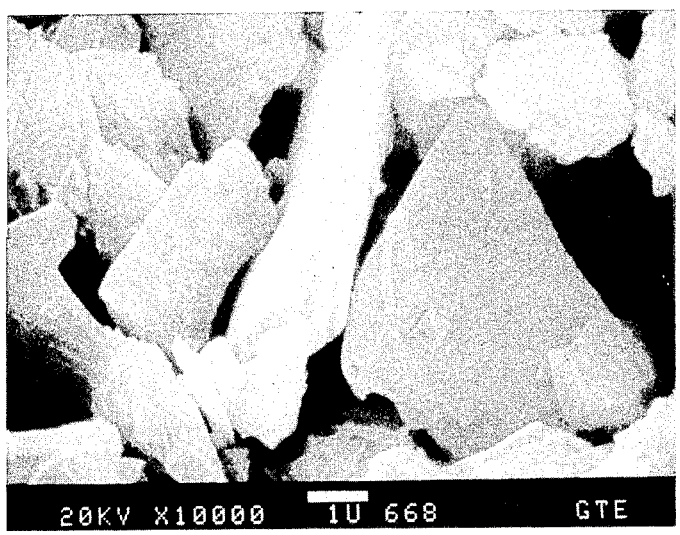

For a better understanding of the present invention, together with other and further objects, advantages, and capabilities thereof, reference is made to the following disclosure and appended claims in connection with the above described figures and description of some of the aspects of the invention.

The glasses can be essentially any non-metallic glasses which form an amorphous phase on rapid cooling. The especially preferred glasses of this invention are pyrex, quartz, borosilicates, soda lime, lead silicate, and borates.

It is preferred to have a homogeneous heat of glass which has a predetermined softening point.

The heat of glass is crushed by standard methods to produce irregularly shaped particles and classified if necessary by standard methods to provide the desired particle size which is determined by the application in which the finished spherical particles are to be used. The particle size is a combination of the mean diameter in micrometers and particle size distribution.

The resulting particles are then entrained in a carrier gas which is a non-reducing gas with argon being the preferred gas. Other non-reducing gases which can be used are helium and nitrogen, oxygen, and air.

The entrained particles are then fed into a high temperature zone having a temperature sufficiently above the softening point of the glass to allow surface tension to subsequently spheroidize the particles and having a temperature below the vaporization temperature of the glass.

The particles are maintained in the high temperature zone which is preferably a plasma for a sufficient time to convert at least a portion which is at least about 90% of the particles into droplets without the formation of a substantial amount of filaments.

The droplets are then cooled to form solid spheres having essentially the same particle size as the irregularly shaped particles and a substantially reduced surface area as compared with the irregularly shaped particles. It is preferred that the droplets be cooled relatively rapidly to prevent phase separation in the droplets. The rapid cooling is accomplished in the plasma operation by the particles being cooled in flight before they hit a surface.

In acccordance with a preferred embodiment of this invention the preferred high temperature zone is a plasma.

Details of the principles and operation of plasma reactors are well known. The plasma has a high temperature zone, but in cross section, the temperatures can vary form about 5500° C. to about 17,000° C. The outer edges are at low temperatures and the inner part is at a higher temperature. The residence time depends upon where the particles entrained in the carrier gas are injected into the nozzle of the plasma gun. Thus, if the particles are injected into the outer edge, the residence time must be longer and if they are injected into the inner portion, the residence time is shorter. Thus residence time in the plasma flame can be controlled by choosing the point at which the particles are injected into the plasma. Residence time in the plasma is a function of the thermophysical properties of the plasma gas and the powder material itself for a given set of plasma operating conditions and powder particles. Residence times are generally from about 50 milliseconds to about 100 milliseconds depending on the particle size.

The plasma gas is a non-reducing gas with argon being the preferred gas. Other suitable non-reducing gases are helium and nitrogen.

It is essential that the particles not touch each other otherwise they agglomerate and coelesce in the plasma and form large particles.

The plasma process is advantageous for producing fine spherical glass particles because the extremely high temperatures afforded by the plasma are necessary to achieve the low viscosity which is critical to form spheres in glasses.

The spherical particles can be further classified to produce the desired size range and distribution.

Controlled intitial crushing and milling parameters of the starting glass, controlled plasma heating parameters, and the subsequent air classification of the spherical particles results in a high yield of very clean spherical glass particles having the desired particle size range and distribution.

Details on the specific conditions for producing a particular particle size for a specific glass will be apparent in the examples that ensue.

The particles produced have the preferred compositions given previously.

Particles haivng a diameter of less than about 25 micrometers can find use in glass filled polymers for hardening and wear resistance.

Particles having a diameter of less than about 10 micrometers can find use in glass filled polymers primarily as a strengthening dispersoid.

Particles having a diameter of less than about 5 micrometers can find use in thick film pastes which allow dispersion of the conductive metallilc particle and bonding to non-metallic substrates. Spherical glass particles can aid in the fluidity of the paste and the ease with which the binders carriers can be removed.

To more fully illustrate this invention, the following non-limiting example is presented.

EXAMPLE

Figure 2:
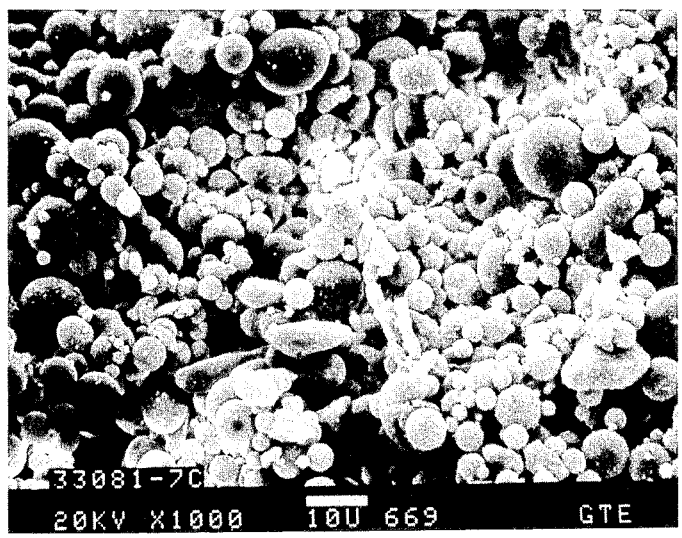
FIG. 2 shows photomicrographs of spherical glass particles produced by the process of this invention.
Figure 2:

An argon plasma flame is generated with a gas flow of about 30 l/min. with about 15 kilowatts of input power of about 500 amps and about 30 volts. The power can be typically from about 10 to about 80 kilowatts. Soda lime powder having a particle size of less than about 20 micrometers with a median particle size of about 5.7 micrometers and having a surface area of about 0.98 $m^2/g$ is introduced into the plasma flame at a rate of about 25 g/min. being fed by a carrier gas at a flow rate of about 3 l/min. The flow rate of the carrier gas can be typically from about 1 to about 10 l/min. The powder is melted in flight in the plasma and collected in a chamber which has an atmosphere of air. The resulting powder has a particle size of less than about 20 micrometers with a median particle size of about 6.8 micrometers which is essentially the same particle size as the starting powder. The surface area of the resulting powder is about 0.72 $m^2/g$ before air classification. This represents a 9% decrease in the effective surface area when contrasted with 0.79 $m^2/g$ which is the size adjusted equivalent surface area for 6.8 micrometers avertage diameter particles having the same shape and surface characteristices as the starting material. It can be demonstrated that the surface area can be further reduced to about 0.46 $m^2/g$ which approaches the theoretical limit of 0.42 $m^2/g$ at perfect sphericity. This is a 40% reduction in effective surface area and is accomplished by air classifying the powder to remove the very fine extraneous material on the surface of the spheres. Photomicrographs of the starting powder and the resulting plasma sprayed powder are shown in FIGS. 1 and 2 respectively at magnifications of about 1000× and about 10,000×. It can be seen that the starting powder particles are not spherical but are irregular in shape whereas the plasma sprayed powder particles of this invention are essentially spherical in shape.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing substantially spherical particles comprising:
   (a) providing irregularly shaped glass particles having a predetermined particle size of less than about 20 micrometers in diameter;
   (b) entraining said particles in a carrier gas;
   (c) feeding said particles into a high temperature zone having a temperature sufficiently above the softening point of said glass to allow surface tension to subsequently spheroidize said glass particles and having a temperature below the vaporization temperature of said glass, said high temperature zone being from about 5500° C. to about 17,000° C.;
   (d) maintaining said particles in said temperature zone for a sufficient time to convert at least about 90% of said particles into droplets without formation of substantial amounts of filaments; and
   (e) cooling said droplets to form solid spheres having essentially the same particles size as said irregularly shaped particles and a reduced surface area as compared with said irregularly shaped particles.

2. A process of claim 1 wherein said glass is a non-metallic glass which forms an amorphous phase upon rapid cooling.

3. A process of claim 2 wherein said glass is selected from the group consisting of pyrex, quartz, soda lime, lead silicate and borates.

4. A process of claim 1 wherein said high temeprature zone is a plasma.

* * * * *